April 14, 1964  K. J. J. McGOWAN  3,128,721
WEIGHT PROPORTIONAL VEHICLE SPEED CONTROLLING APPARATUS
Filed June 9, 1961  3 Sheets-Sheet 1

INVENTOR.
Kenneth J. J. McGowan.
BY W. L. Stout
HIS ATTORNEY

# United States Patent Office 3,128,721
Patented Apr. 14, 1964

3,128,721
WEIGHT PROPORTIONAL VEHICLE SPEED
CONTROLLING APPARATUS
Kenneth J. J. McGowan, Richmond, Ind., assignor to
Westinghouse Air Brake Company, Wilmerding, Pa.,
a corporation of Pennsylvania
Filed June 9, 1961, Ser. No. 115,953
31 Claims. (Cl. 104—162)

My invention relates to vehicle speed controlling apparatus and, particularly, to apparatus fixed relatively to a trackway for either increasing or decreasing the kinetic energy of railway cars by an amount according to their weight and whether the routing of the cars is over flat or inclined track.

It has long been the practice in gravity type classification yards to push the cars over a hump and allow them to descend by gravity over prescribed routes to their assigned class tracks. To control the speed of the cars, car retarder units capable of exerting different degrees of retardation are employed. One type of existing car retarder consists of braking bars disposed adjacent the rails and arranged for engagement with the wheels of the cars to apply varying degrees of friction. Car retarders of this type are generally huge and bulky and sometimes become smeared with certain substances from the cars such, for example, as oil or grease which reduce the effectiveness of the braking effort. In other known cases, cars which are new or which have recently been reconditioned often have their wheels inadvertently covered with paint with the result that, until the paint is worn off through ordinary use, the braking bars are unable to grip the cars with enough friction to reduce the speed of the cars to the desired leaving speed. The cars therefore proceed to their assigned points in the classification yard without sufficient reduction in speed so that they couple with other cars at speeds which are higher than desirable. Thus, although retarders of the brake bar type have for many years exhibited very satisfactory operating performance, it has been found that the normally precise and reliable speed control effort characteristic of brake bar retarders is at times ineffective.

In smaller hump yards or in locations where the terrain is fairly level, gravity type yards have been found economically unfeasible and flat switching yards are usually constructed instead. In yards of the flat type, the cars are moved into their respective class tracks by a motor power unit which moves alternately back and forth and with each forward movement propels the car being humped away from the train, the car then being routed to its assigned class track. If desired, brakemen may be employed on the cars to control their coupling force which leads to a considerable financial expense for manpower. Moreover, it often occurs, in both the gravity and flat type yards, that cars will stop short of their assigned destinations and thus fail to couple with the respective cars which preceded them. Under such conditions, considerable storage space in the class tracks is lost thus requiring the use of trimmer engines and causing suspension of humping in the affected class tracks during the time required by the trimmer engine to dress the yard. The loss of valuable time and the expense incurred from such delays materially affect the high level of service constantly sought in classification yard operations.

To overcome the prevalent above-noted obstacles to efficient classification yard operation, it is a principal object of my invention to provide a vehicle speed controller, remotely controllable, which, under certain conditions, will receive and dissipate the kinetic energy of a humped railway car, to slow down the car, and which, under other conditions, as when the car shows signs of insufficient speed, will increase the kinetic energy of the car to augment its speed and thereby impel the car toward its assigned class track.

A further object of my invention is to provide combination car retarder and accelerator apparatus which may be employed for the control of traffic in a railway classification yard regardless of the direction of traffic in the yard and further, regardless of the grade or slope of the track therein.

Yet another object of my invention is to provide a vehicle speed controller of extremely versatile nature which may quickly and automatically be converted from a car retarder to a car accelerator and vice versa depending on the type of speed control desired.

Still another object of my invention is to provide a vehicle speed controller which has the same braking capacity as brake bar type retarders heretofore used and which is appreciably shorter in length than such existing retarders.

Yet another object of my invention is to provide highly efficient car retarder apparatus which operates independently of external sources of power following the establishment of initial fluid requirements therein.

A principal object of my invention is to provide a combination retarder-accelerator whose control effort is in proportion to the weight of the car being controlled and in direct proportion to the weight distribution on respective wheels of the car.

Still another object of my invention is to provide car accelerator apparatus capable of restarting a car in the direction of its original travel should the car be brought to a complete stop within the limit of the apparatus because of excessive retardation.

To attain the foregoing objects, I provide a weigh treadle fixed relatively to a track rail of a railway track in a position to be engaged by a wheel running on the rail for translating the load sustained by the wheel into a fluid pressure force indicating the magnitude of the load. A pressure control valve responsive to the fluid pressure force contains such fluid pressure force substantially unchanged until the arrival on and consequent actuation of the treadle by a subsequent wheel. A plurality of speed control treadles similarly positioned relatively to the track rail are disposed downgrade of the weigh treadle and are controlled successively by the fluid pressure force stored in the pressure control valve for developing against the wheels, in accordance with the type of speed control desired, either a retarding or an accelerating effort proportional to the value of the stored fluid pressure force. In the general economy of the invention, retardation or acceleration is obtained by timely control of the relation of the speed treadles to the car wheels during the time the speed control effort is desired. When the apparatus embodying my invention is used as a retarder, retardation is accomplished by applying against the wheels a resisting force directed to oppose their rotation. When the apparatus of my invention is used as an accelerator, acceleration is obtained by applying against the wheels, in the direction of their rotation, an accelerating force which imparts energy to the car. In both cases, as will appear, the retarding or accelerating effort provided by the apparatus embodying my invention is determined by the volume of hydraulic fluid displaced by each wheel actuating the weigh treadle.

Other objects and advantages of my invention will become apparent from the following description and from an examination of the accompanying drawings in which:

FIG. 2 is an end view, partly in cross-section, of FIG.

1 illustrating in detail a portion of the weigh treadle of the vehicle speed control apparatus embodying my invention and also illustrating in vertical relation the relative positions of the parts with respect to the rails;

Similar reference characters refer to similar parts in each of the several views.

I shall describe one form of vehicle speed controlling apparatus embodying my invention, and shall then point out the novel features thereof in the appended claims.

*General Description*

Figure 1:
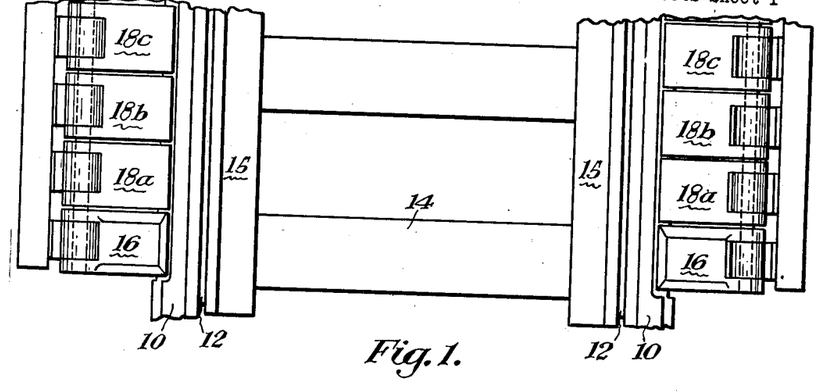
FIG. 1 is a plan view of the hydraulic lever members for vehicle speed control apparatus embodying my invention positioned adjacent the rails of a track in the intended manner.
Figure 2:
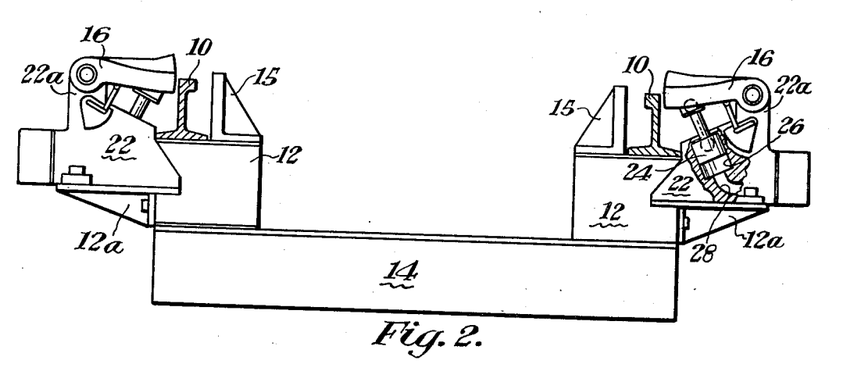

Referring to FIGS. 1 and 2, I have shown a trackway including track rails 10 mounted in rigid relation on supports or stands 12 which are in turn mounted on ties 14. Guard rails 15 are also mounted on stands 12 adjacent each rail in a well known manner to prevent derailment. Mounted on stands 12, on the outer side thereof, are outwardly extending brackets 12a, that portion of the apparatus of my invention which is acted upon by the wheels of a car being mounted in turn on these brackets.

Figure 3:
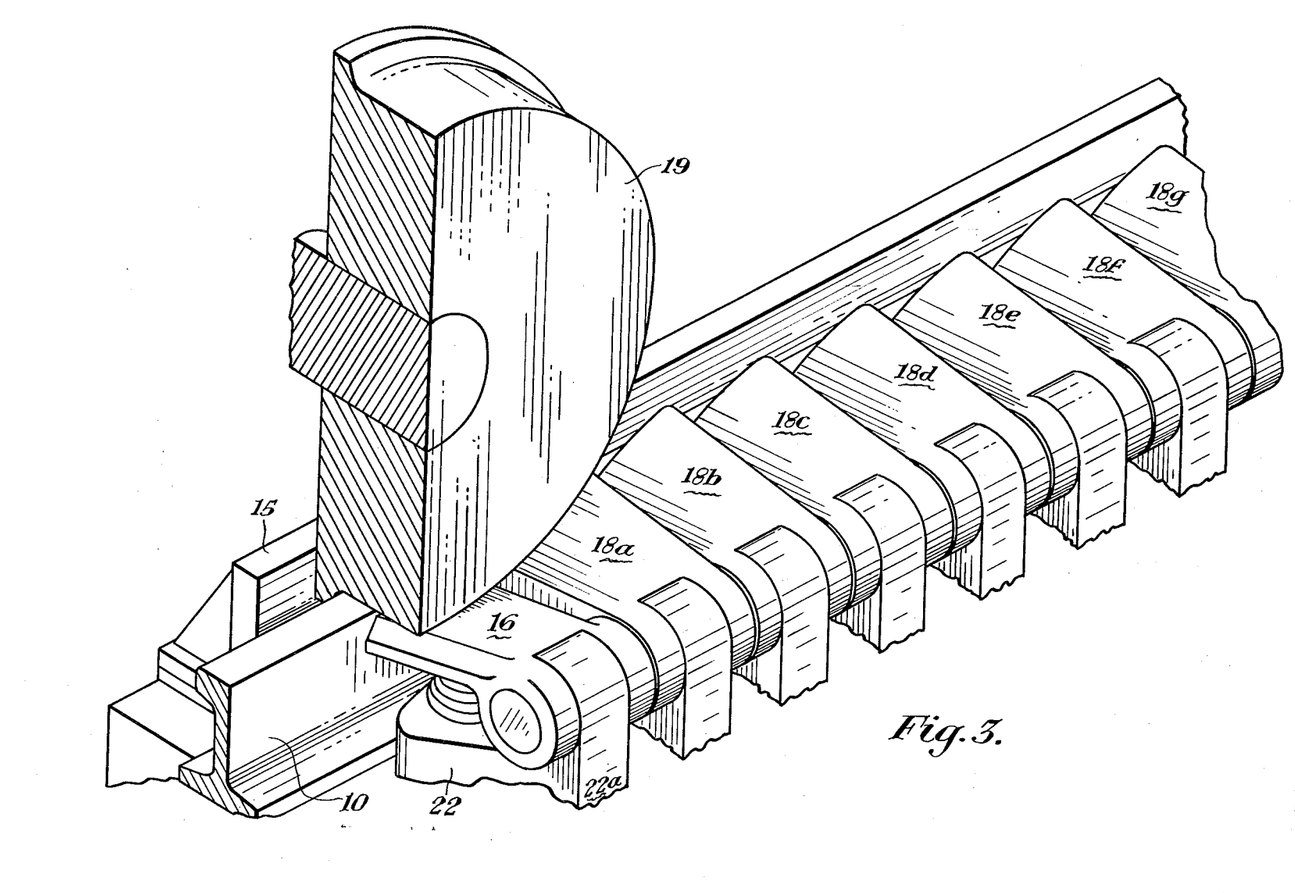
FIG. 3 is an isometric view of a wheel of a railway vehicle cooperating with certain ones of the treadles embodying my invention shown in FIG. 1 and FIG. 2.
Figures 4, 4A:
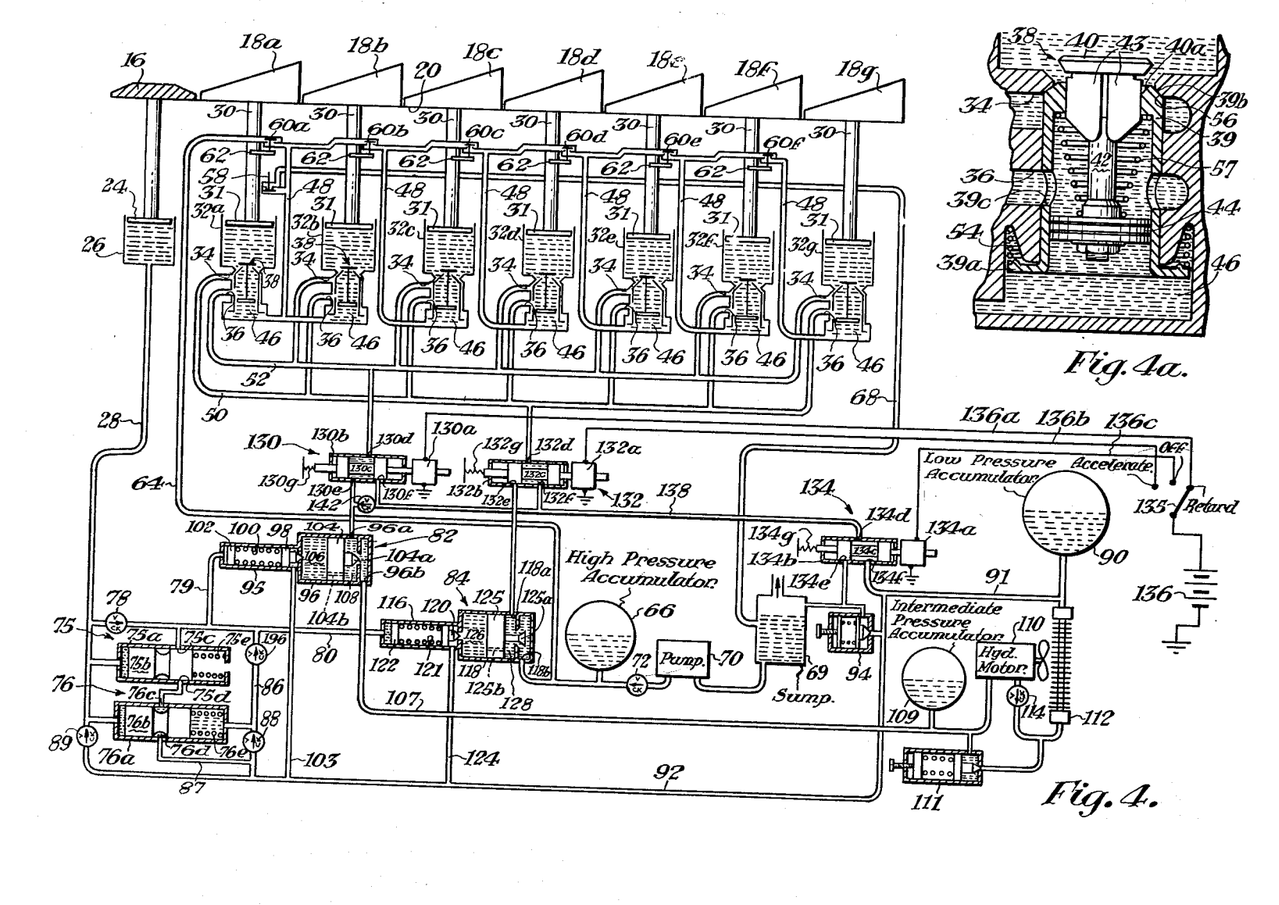
FIG. 4 is a schematic diagram of the hydraulic system for vehicle speed controlling apparatus embodying my invention.
FIG. 4a is a enlarged view of a compound valve illustrated schematically in FIG. 4.
Figure 5:
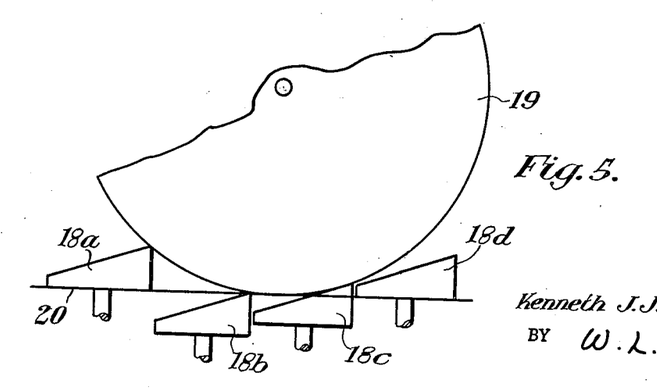
FIG. 5 is a fragmentary view showing a wheel and several schematically illustrated treadles of the apparatus embodying my invention to show the various positions the treadles occupy under a wheel.

Referring now also to FIG. 3, I have shown one complete unit of speed controlling apparatus embodying my invention. This unit includes a weigh treadle 16 and seven substantially sawtooth-shaped speed control levers 18a–18g. The treadles are placed adjacent to the associated rail in positions to be engaged by car wheels such for example as the wheel 19 so that the rims of the wheels tend to force the treadles downwardly, the wheel 19 indicating roughly the size of the treadles relative to the wheel. The outer portions of the heads of rails 10 are removed in order to enable the greatest area possible of the wheel to engage the treadles. In FIG. 4, the horizontal line 20 drawn through the bases of treadles 16 and 18a–18g indicates the tread or running surface of rails 10. Each of the treadles is pivotally mounted on the upright portion 22a (FIG. 2) of a support member 22 fixed at its base to one of the brackets 12a. The treadles associated with one rail are located directly opposite corresponding treadles associated with the other rail so that opposite treadles may be concurrently engaged by wheels on the same axle. Because of the symmetrical arrangement at both rails of the apparatus embodying my invention, and because of the identical construction and operation of the apparatus, as will appear, a description of the details of construction and operation of the appraatus associated wiht only one of the rails is considered sufficient for a complete understanding of my invention.

Weigh treadle 16 is beveled at its leading and trailing edges to cushion the impact of the wheels thereon and, as seen in FIGS. 2 and 4, is connected to a piston rod carrying a piston 24 mounted in a cylinder 26 formed internally of the support member 22 associated therewith. A fluid conduit 28 connects with the base of cylinder 26 to receive the fluid which will be displaced as the wheel engages treadle 16. Treadle 16 is designed to be pushed down by the weight of a wheel passing over it. The extent of its downward movement and the pressure of the fluid displaced from cylinder 26 into conduit 28 depends on the weight of the car and its freight, and specifically, on the weight distribution on each wheel when that wheel is acting on the treadle 16. The tread surfaces of treadles 18a–18g are inclined upwardly in the direction of traffic which is from left to right as oriented in FIG. 4. The front or leading edges of the treadles, that is, that part engaged first by the wheels, is slightly higher than the plane 20 of the running surface of the rails. The trailing edge of the treadles, that is, that part thereof ending in the apex, rises to a level of about three inches above the rails. The upward slope of the treadles minimizes the possibility of structural damage, and, when the apparatus is used as a retarder, results in a more uniform application of force against the wheels.

Moreover, in my present invention the unit incorporating all of the treadles 16 and 18a–18g is approximately five feet in total length. This is intentionally made less than the standard wheel base of five feet six inches common in freight cars of the truck type encountered in the United States. Obviously then, with rare exception, the construction of my present invention precludes both wheels on any truck, or the wheels on trucks of adjacent cars, from acting upon the unit at the same time. The reason for this construction will be made clear as the description proceeds. It will be appreciated also that, when my invention is used in a locale where standards of operation are different from those normally encountered in railway classification yards, that the length of the unit may easily be changed, by either adding to or removing from the system one or more of the treadles.

Referring now to FIG. 4, treadles 18a–18g are connected to piston rods 30 which carry pistons 31 movable respectively in cylinders 32a–32g filled with hydraulic fluid. These cylinders containing pistons 31 are schematically shown in FIG. 4; however it will be understood that the cylinders are formed internally of the support members 22 to which each of the treadles 18a–18g is pivotally connected. Each of the cylinders is provided with ports 34 and 36 and contains a schematically represented compound valve which controls fluid flow between these ports and the cylinder upper main chamber, these valves being generally designated 38 as shown only in cylinders 32a and 32b.

One of these valves is shown in greater detail in FIG. 4a and comprises a main valve 39 and a pilot valve 40 having a valve seat 40a at the upper end of valve 39. Connected with valve 40 by means of a piston rod 42 mounted centrally internally of valve 39, and carrying vanes 43 which maintain valves 39 and 40 in concentric relation, is a piston 44. Formed below piston 44 at the base of each cylinder 32a–32g is a lower fluid chamber 46. Chamber 46 in cylinder 32a is connected directly with chamber 46 in cylinder 32b, both lower chambers feeding into a fluid conduit 48. Connections to the chambers 46 in the cylinders associated with all of the other treadles are made to single other conduits 48. Port 34 of cylinder 32a is connected to one outlet port of a manifold line 50. The other outlets of line 50 are connected with ports 36 of the cylinders associated with all of the other treadles. Port 36 of cylinder 32a is connected to one outlet port of a manifold line 52. The other outlets of line 52 are connected to ports 34 of the cylinders associated with all of the other treadles.

Valve 39 is formed at its base with a flange 39a and is biased downwardly by a spring 54 caged between the flange and an abutment formed in the cylinder body. The upper end of valve 39 is beveled, as suggested at 39b, and this beveled portion of the valve closes against a similarly sloping portion 56 of the cylinder wall when the valve is shifted upwardly, as shown. Substantially midway between the ends of valve 39 is a peripheral opening 39c which, when the valve occupies the position shown in FIG. 4a, is in registry with port 36. To bias valve 40 toward its seat, I have shown a spring 57 surrounding piston rod 42 and caged between piston 44 and valve 39.

Valves 39 and 40 remain in the positions shown in FIG. 4a so long as a greater force acts upwardly on piston 44 than downwardly. For example, when the pressure in chamber 46 is great enough to overcome the force of spring 57 and the pressure of the fluid entering port 36, piston 44 is lifted to lift valve 40, in opposition to the action of spring 57, from its seat. Valve 39, in opposition to the biasing force of spring 54, will likewise be lifted, both valves then assuming positions whereby fluid between port 36 and the cylinder upper main chamber may pass in either direction. For valves 39 and 40 to shift from the positions shown, the pressure differential acting on piston 44 reverses to the point that springs 54 and 57 influence the movement of the valves. For example, when pressure in chamber 46 decreases to a value sufficient to allow the force of spring 57 and the pressure of the fluid in port 36 to actuate the piston, valve 40 is carried downwardly by the piston and strikes against valve 39, thus driving valve 39 downwardly, in agreement with the action of spring 54, to cover port 36 and uncover port 34. Fluid in the system is now allowed to pass between port 34 and the cylinder upper main chamber. Thus, it will be clear that the direction of hydraulic actuation of valve 39 and valve 40 depends on the pressure acting on the flanged bottom of valve 39 and over the ends of piston 44.

To control the application of fluid to the chambers 46, I provide a poppet valve 58 associated only with treadle 18a and a plurality of poppet valves 60a–60f associated respectively with treadles 18a–18f. Such valves are common in the art, and, in the present embodiment, the valves are biased (by means not shown) to closed positions in the absence of an actuating force. Securely fastened to each of the piston rods 30, in a position to engage the stems of valve 58 and valves 60a–60f, is an actuating arm 62 movable vertically between two positions in response to movement of the treadles. Valves 60a–60f are placed in series with each other and normally feed into a fluid conduit 64 connected with the outlet of an accumulator 66 of high pressure fluid. Valve 58 through conduit 68 at times communicates with a sump 69 vented to the atmosphere as shown. A hydraulic pump 70 is connected with sump 69, and also with accumulator 66 through a check valve 72 arranged to prevent pressure in accumulator 66 from escaping back toward the pump.

In the standby condition of the apparatus, valves 60a–60f are open and valve 58 is closed. As the wheel of a railway car passes over the rails at the point where the treadles are positioned, the treadles are depressed and the corresponding directional movement of the valve actuating arms causes valve 60a–60f to close successively. In the case of treadle 18a, its actuating arm is so adjusted as to bring about the opening of valve 58 before valve 60b associated with treadle 18b is allowed to close, for a reason which will soon appear. Specifically, when valve 60a is open, high pressure fluid from accumulator 66 enters chamber 46 of cylinder 32a through conduit 48. The force of this fluid drives valve 40 upwardly from its seat and moves valve 39 to the position shown causing ports 34 and 36 of cylinder 32a to be covered and uncovered respectively. On the other hand, with valve 60a closed, and valve 58 open, the pressure in chamber 46 in the cylinders associated with all of the treadles is relieved inasmuch as the conduits 48 are all now vented to fluid at atmospheric pressure through conduit 68, valve 58, and the series connected poppet valves 60b–60c. When this happens, valve 40 is moved downwardly against its seat and valve 39 is driven downwardly by valve 40 to a position in which ports 34 and 36 are uncovered and covered respectively.

The displaced fluid in conduit 28 caused by a wheel impinging on treadle 16 flows over one path to the inlet ports of two spool valves of conventional construction generally indicated 75 and 76. Valves 75 and 76 respectively include cylinders 75a and 76a having pistons 75b and 76b mounted respectively therein for controlling the flow of fluid between ports 75c, 75d and 76c, 76d, respectively. This fluid is transmitted over a second path including a check valve 78 to conduits 79 and 80 communicating respectively with the inlet ports of two pressure control valves generally indicated 82 and 84. Piston 75b, whose right end is exposed to atmosphere, is biased by a spring 75e to normally cover ports 75c, 75d. Piston 76b is biased to normally uncover ports 76c, 76d, by means of a spring 76e contained in a chamber communicating with a conduit 86. Ports 75d and 76c are hydraulically interconnected; port 76d feeds into a conduit 87 which is connected with conduit 86 through a check valve 88, and also connected with the input ends of pistons 75b and 76b through a check valve 89 arranged to prevent the passage of fluid from conduit 28. Valve 89, however, is oriented to permit flow into conduit 28 from a low pressure accumulator 90 communicating with conduit 28 through valve 89 and conduits 91 and 92. Accumulator 90 also communicates with sump 69, for the purpose of recharging it with fluid, through conduit 91 and a pressure relief valve 94 comprising the usual valve and adjustable biasing means. Valve 94 is biased closed with a force approximately equal to the pressure, to be discussed hereinbelow, in accumulator 90, so that when the pressure in the accumulator exceeds a preselected value, valve 94 opens and provides pressure relief for the accumulator. A check valve 196 in conduit 86 is arranged to prevent fluid in lines 79 and 80 from flowing into conduit 86 but readily passes fluid in the opposite direction when piston 76b is shifted to the right.

Springs 75e and 76e are so proportioned that piston 75b will not shift until piston 76b has shifted. That is, the pressure in line 28 when piston 75b shifts must exceed the pressure when piston 76b shifts by an amount sufficient to overcome the bias of spring 75e. Also, the force biasing valve 78 closed is such that valve 78 prevents hydraulic fluid from passing through it until both pistons 75b and 76b have shifted. Considering therefore the order of operation of valve 78 and pistons 75b and 76b, a pressure wave in conduit 28 causes piston 76b to shift, piston 75b to subsequently shift, and, later, valve 78 to open. Thus, when pressure in line 28 is great enough to overcome the spring force on piston 76b, the piston will shift and cover ports 76c, 76d. As pressure in conduit 28 increases, piston 75b shifts to the right and uncovers ports 75c, 75d. When the pressure in conduit 28 reaches a value sufficient to overcome the force resisting actuation of valve 78, valve 78 opens and passes into conduits 79 and 80 the fluid displaced by piston 24.

It will thus be understood that the fluid which charges conduits 79 and 80 following the opening of valve 78 is pressurized to a degree accurately proportional to the load sustained by the vehicle wheel.

The pressure in conduit 28 decreases as the wheel moves off treadle 16 and valve 78 closes and piston 75b returns to cover ports 75c, 75d. As the pressure decreases, piston 76b will shift to the left with fluid from accumulator 90 being drawn into conduit 86 through valve 88 to refill the right-hand end of valve 76. Piston 76b by this movement uncovers ports 76c, 76d whereby the system is placed in condition for actuation by another wheel. Due to the orientation of check valves 78 and 196, it will be apparent that the pressurized fluid trapped in lines 79 and 80 is prevented from escaping from these lines at this time.

After the first wheel of a car truck has passed over the weigh treadle, the second wheel of the truck will engage and likewise depress treadle 16. This sets the pressure in conduit 28 to a value representing the weight sustained by the second wheel. Since conduits 79 and 80 are already filled with fluid due to the action of the first wheel, and since check valve 88 prevents the fluid in line 86 from entering conduit 92, piston 76b is now precluded from shifting and retains its position. As will be appreciated, the motion of piston 75b in valve 75 is opposed merely by atmospheric pressure. At this time, therefore, piston 75b shifts to the right, and, by uncovering ports 75c, 75d relieves the pressure in conduits 79 and 80 to low pressure accumulator 90 through ports 75c, 75d of valve 75, ports 76c, 76d of valve 76, and conduits 87, 92 and 91. Valve 94 meantime will remain closed as long as the pressure in conduit 92 remains below that preselected for accumulator 90. As soon as the pressure in conduits 79 and 80 drops piston 76b shifts to the right to cover ports 76c, 76d, and the fluid displaced into conduit 86 by this movement is passed through valve 196 to conduits 79 and 80. When the overpressure in conduit 28 attains a value sufficient to overcome the biasing force on valve 78, fluid will again pass from conduit 28 into conduits 79 and 80. The pressure of the fluid in conduits 79 and 80 now corresponds to the weight sustained by the second wheel. Upon the departure of the second wheel from treadle 16, valve 78 and pistons 75b and 76b revert to their original positions, in the manner hereinabove described, to render the system responsive to the next wheel. A third wheel and subsequent wheels of the car will cause valve 78 and pistons 75b and 76b to operate sequentially in a manner the same as that described in connection with the wheels of the first truck of the car.

Pressure control valves 82 and 84 are modifications of the type of valve disclosed in "Kent's Mechanical Engineers Handbook," 12th ed., FIG. 32, pages 13–15 and 13–16. These valves, in the manner which will be described, develop and maintain therewithin a fluid pressure force proportional to the pressure built up in conduits 79 and 80 in response to the actuation of treadle 16.

Pressure control valve 82 is partitioned into two cylinders 95 and 96 communicating with each other through an opening controlled by a valve 98 biased normally toward its seat by a spring 100 contained in cylinder 95 between valve 98 and one end of a piston 102 at whose other end a fluid connection exists with conduit 79. A conduit 103 connects with conduit 92 and communicates with cylinder 95 adjacent valve 98. Mounted in cylinder 96 for controlling the flow of fluid between ports 96a and 96b of the cylinder, is the valve portion 104a of a main valve piston 104 including an orifice 104b which communicates with chambers 106 and 108 on opposite sides of piston 104. A conduit 107 connecting with port 96b communicates directly with an intermediate pressure accumulator 109 and with the respective inlet ports of a hydraulic motor 110 and a relief valve 111. Motor 110 and the relief valve in turn have their outlet ports exposed to low pressure accumulator 90 through a cooler 112 provided with cooling fins, as shown, exposed to the fan of the motor. A check valve 114 which insures unidirectional operation of the motor is connected in the lines between the outlet port of the motor and the inlet to the cooler. In the standby condition, fluid from accumulator 109 enters pressure control valve 82 through conduit 107 to normally unseat valve 104a, as shown.

Pressure control valve 84 is likewise partitioned, into two cylinders 116 and 118 fluidly connected with each other through an opening controlled by a valve 120 biased normally against its seat by a spring 121 contained in cylinder 116 between valve 120 and one end of a piston 122 at whose other end a fluid connection exists with conduit 80. A conduit 124 connects with conduit 92 and with cylinder 116 adjacent valve 120. Mounted in cylinder 118 for controlling the flow of fluid between ports 118a and 118b of the cylinder, is the valve portion 125a of a main valve piston 125 having an orifice 125b which communicates with chambers 126 and 128 on opposite sides of piston 125. Port 118b communicates directly with accumulator 66. In the standby condition, fluid from accumulator 66 enters chamber 128 in pressure control valve 84 and tends to force valve 125a against its seat. It will be seen that pressure control valves 82 and 84 are of essentially similar construction, the directions in which valves 104a and 125a must move in order to open and close merely being reversed.

Depending on whether retardation or acceleration is desired, pressure control valves 82 and 84 are so connected in the hydraulic circuit that one is placed in the system while the other is made inactive. For controlling the selection of the pressure control valves, I provide a circuit controller 135 having Retard, Off and Accelerate positions, which controller selectively effects energization of three solenoid valves 130, 132 and 134. Circuit controller 135 may be controlled either locally or remotely, and is connected to one terminal of a source of direct current, herein shown as a battery 136, whose other terminal is grounded. As schematically indicated, solenoid valves 130, 132 and 134 include windings 130a, 132a and 134a which are connected respectively with battery 136, depending on the position of circuit controller 135, over wires 136a, 136b and 136c whereby the solenoid valves may be actuated one at a time.

Solenoid valve 130 comprises a cylinder 130b having mounted therein a spool valve 130c reciprocable between two positions for at times, when winding 130a is energized, as herein shown, establishing communication only between ports 130d and 130e and, at other times, when winding 130a is deenergized, for establishing communication only between ports 130d and 130f. Spool valve 130c is acted upon by a spring 130g tending to force it to cover port 130e and uncover port 130f. Port 130d of solenoid valve 130 communicates with manifold line 52 whereas port 130e communicates with chamber 108 in pressure control valve 82 and port 130f communicates with port 132f of solenoid valve 132 and with a conduit 138 communicating with port 134d of solenoid valve 134.

Solenoid valve 132 comprises a cylinder 132b and a spool valve 132c reciprocable therein between two positions for at times, when winding 132a is deenergized, as herein shown, establishing communication only between ports 132d and 132f and, at other times, when winding 132a is energized, for establishing communication only between ports 132d and 132e. As a result of a spring 132g, spool valve 132c is biased to a position which affords communication only between port 132d and port 132f. Port 132d of solenoid valve 132 communicates with manifold line 50 whereas port 132e communicates with chamber 128 in pressure control valve 84.

The third solenoid valve 134 includes a cylinder 134b containing a spool valve 134c reciprocable between two positions for at times, when winding 134a is deenergized, as herein shown, establishing communication only between port 134d and port 134f and, at other times, when winding 134a is energized, establishing communication only between port 134d and port 134e. By means of a spring 134g, spool valve 134c is biased to a position to establish communication only between port 134d and port 134f when winding 134a is deenergized. Port 134e of solenoid valve 134 is exposed to atmosphere through the sump and port 134f is exposed to conduit 92 and, through conduit 91, to low pressure accumulator 90.

Having described the details of the apparatus embodying my invention, I will now describe operational examples of the apparatus when it is used as a retarder, as an accelerator, when the apparatus is placed in such condition that traffic travels over the treadles as if they were not there, and when the apparatus functions to restart a vehicle which has been brought to a complete standstill due, for example, to excessive retardation.

*Retarder*

Let us assume that a car is moving over rails 10 and is approaching the trackside apparatus at a speed greater than desired so that it is necessary to reduce the speed of the car. Accordingly, circuit controller 135 is set to the Retard position whereby winding 130a of solenoid valve 130 becomes energized, the other solenoid valves 132 and 134 remaining deenergized. At this time, poppet valve 58 is closed. Also, low pressure fluid from accumulator 90 is injected into conduit 28 through lines 91, 92 and check valve 89. The poppet valves 60a–60f, however, are all open so that chambers 46 in the cylinders associated with treadles 18a–18g are charged with high pressure fluid from accumulator 66 through line 64 and the lines 48. Under these initial conditions, the pressure at the lower side of piston 44 in cylinders 32a–32g is much greater than at the upper side whereupon valves 39 and 40 are actuated to the positions shown in FIG. 4a. As a result, port 34 in cylinder 32a and ports 36 in the cylinders associated with the other treadles are exposed to the fluid in accumulator 90 through manifold line 50, ports 132d and 132f of solenoid valve 132, conduit 138, ports 134d and 134f of solenoid valve 134, and conduit 91; low pressure fluid is thus injected into the cylinders 32b–32g. As was previously mentioned, valve 104a in cylinder 96 of pressure control valve 82 is fluid biased away from its seat in the standby condition. Fluid from accumulator 109 is therefore injected into cylinder 32a through manifold line 52, ports 130d and 130e of solenoid valve 130, ports 96a and 96b of pressure control valve 82, and conduit 107. Ports 34, now covered, in the cylinders 32b–32g are also exposed to this fluid.

As soon as the first truck wheel of a car contacts treadle 16, fluid is displaced into conduit 28 by piston 24 to cause check valve 78 and pistons 75b and 76b of spool valves 75 and 76 to operate sequentially in the manner described hereinabove. The net effect is that a pressure is developed in conduits 79 and 80 which is proportional to the load sustained by the wheel. The pressure in conduit 79 acts against piston 102 in pressure control valve 82 and increases the compression of spring 100 which, in turn, increases the force holding valve 98 closed. Although piston 122 in cylinder 116 of the other pressure control valve 84 is acted upon simultaneously by the higher pressure in line 80, pressure control valve 84 is effectively disconnected from the system inasmuch as port 132e of solenoid valve 132 is covered during Retard operation. It will be plain that the pressure setting now holding valve 98 closed is proportional to the weight load carried by the wheel, and that for the fluid in chamber 106 to escape into line 103 through the port controlled by valve 98, the increased force biasing valve 98 closed must be overcome. In turn, in order for piston 104 to move now to its left, fluid entering chamber 108 through port 96a of cylinder 96 must attain a pressure great enough to overcome the pressure locked in chamber 106. It follows that when the pressure in chamber 108 reaches this increased value, piston 104 will work against the resistance of the fluid in chamber 106 whereupon valve 104a is forced further from its seat and will act as a throttling valve, thus heating the fluid passing into line 107. It is probable that the reaction of piston 104 to the higher pressure in chamber 108 will cause valve 98 to open slightly whereupon a negligible amount of fluid in chamber 106 will run off into line 103. The throttling action of valve 104a will persist as long as fluid continues to enter chamber 108 through the port 96a.

As soon as the wheel leaves treadle 16, the pressure developed in conduit 28 is relieved, and piston 24 is returned to its normal position by the flow from accumulator 90 which enters conduit 28 through valve 89. When the car wheel contacts treadle 18a, it begins to shift causing poppet valve 60a to close. The reaction of treadle 18a to the wheel causes the fluid in cylinder 32a to flow at a sharply increased pressure into chamber 108 in pressure control valve 82, through manifold line 52 and ports 130d and 130e of solenoid valve 130. Piston 104 tends to shift against the restraining action of the fluid in chamber 106 whereupon the fluid entering chamber 108 is throttled or constricted at valve 104a. As will readily be understood, the heat imparted to the fluid due to the throttling action of valve 104a is dissipated to the ambient air, the displaced fluid traveling to accumulator 90 through conduit 107, motor 110, check valve 114, and cooler 112.

When treadle 18a attains a position where its actuating arm 62 engages the stem of poppet valve 58, the wheel has not yet reached treadle 18b and poppet valve 60b is still open. With valve 58 now open and valve 60b still open, chambers 46 in all of the cylinders will now contain fluid at the same pressure as that in the sump. It will be remembered that, under these conditions, valves 39 and 40 in all of the cylinders are moved to positions opposite those shown in FIG. 4a, due to the pressure reversal on the sides of the piston 44. At this time the underside of piston 31 connected to treadle 18a is exposed to the fluid in accumulator 90 through the previously-traced fluid circuit which includes manifold line 50, for the purpose of returning the treadle to its normal position once the wheel ceases to depress it.

When the wheel has advanced well over the area of treadle 18b, threadle 18a is still advancing toward its standby position so that poppet valve 60a is still closed. However, with threadle 18b thus engaged, popped valve 60b has already closed due to the action of the wheel on treadle 18b. As treadle 18b is depressed, fluid from cylinder 32b is expelled through port 34, manifold line 52, ports 130d and 130e of solenoid valve 130, and enters chamber 108 in pressure control valve 82 through 96a thereof. The throttling action of valve 104a again causes the fluid to be heated whereby more energy is removed from the car and dissipated, in the manner previously described. About the time the wheel ceases to act on treadle 18b and begins to engage treadle 18c, treadle 18a will have returned to its standby position so that poppet valve 60a reopens. The reopening of valve 60a recharges chambers 46 in cylinders 32a and 32b, and line 48 between treadles 18a and 18b, with high pressure fluid from accumulator 66 causing the shift of valves 39 and 40 in both cylinders to the positions shown in FIG. 4a. By these movements, port 36 in cylinder 32a is uncovered whereby fluid at the pressure line 52 is admitted to this cylinder. Port 36 in cylinder 32b is now uncovered to expose the underside of the piston 31 connected with treadle 18b to the low pressure fluid in manifold line 50. Treadle 18b is now prepared to likewise be returned to its standby position when left by the wheel.

At the time the wheel prepares to vacate treadle 18b, treadle 18c has already been depressed by the wheel to further reduce the kinetic energy of the car. As the wheel continues to roll over the remaining treadles, treadle 18c goes back to the position in which valve 60c reopens. The remaining treadles will act in a correspondingly similar manner to convert the energy of the car into heat.

The first truck wheel eventually leaves treadle 18g allowing it to return to its standby position whereupon the following hydraulic conditions in the system will prevail: treadle 16 occupies its standby position waiting to measure the load borne by the second truck wheel; the pressure of the fluid in cylinder 32a is the same as the pressure last developed in line 52 when treadle 18g was depressed by the wheel; the cylinders 32b–32g are filled with fluid from low pressure accumulator 90; the chambers 46 in all of the cylinders are recharged with fluid from high pressure accumulator 66; and pistons 75b and 76b respectively of valves 75 and 76 occupy the positions in which they are shown.

Thus, the pressure setting secured in conduit 79 by the first wheel of the truck remains effective and substantially unchanged in amount during the time the wheel is in the retarder.

When the second truck wheel engages treadle 16, piston 76b in spool valve 76 is prevented from moving to the right because of the fluid pressure trapped in conduits 79 and 80, as set forth above. Piston 75b in spool valve 75 therefore shifts to the right first, and, over the fluid path previously traced, enables the fluid in conduits 79 and 80 to escape and flow into accumulator 90. Also, as will be recalled, piston 76b immediately then shifts to the right. When the pressure in conduit 28 attains a value which exceeds the pressure at which valve 78 is set to open, valve 78 then opens causing a displacement of fluid into conduits 79 and 80. The pressure now acting on piston 102 in cylinder 95 of pressure control valve 82 is again set, this time by an amount determined by the weight sustained by the second wheel. The manner of operation of treadles 18a–18g to further retard to speed of the car as the second wheel rolls over the retarder will not be repeated since the operation is obviously the same as that described hereinabove in connection with the first wheel on the truck. It is repeated, however, that the braking effort applied is consistently determined by the weight sustained by the wheel currently in the retarder, and that the weight determination is maintained substantially constant while that wheel traverses the retarder unit.

When the controller embodying my invention is employed as a retarder, the hydraulic system is charged by external apparatus to provide the pressure required in accumulators 90, 109 and 66. While various suitable pressures may be used, typical pressures in accumulators 90, 109, and 66 would be approximately 25 p.s.i., 50 p.s.i., and 3000 p.s.i., respectively. Further recharging once the system has been placed in service need only be done to compensate for fluid leakage or other reasons contributing to loss of hydraulic pressure. Also, when the apparatus is used as a retarder the parts are so proportioned that the pressure in chamber 106 in cylinder 96 of pressure control valve 82, when a wheel load has been determined, can never be greater than the pressure which would prevent any wheel from pushing down any one of the treadles. This operational requirement, while not mandatory, allows use of high treadle force on wheels of heavy cars, but reduces the force applied for light cars, so that no wheel is lifted from the running surface of the rail.

Thus, the use of my invention in Retard operation is economically advantageous in that, exclusive of electrical power to energize winding 130a of solenoid valve 130 and the hydraulic fluid to initially charge the system, no other external power, hydraulic or electric, is required during its operation which, obviously amounts to an appreciable savings in cost.

Another advantage realized during operation of the apparatus as a retarder is that a vehicle is slowed down regardless of weather or climatic conditions and despite adverse wheel conditions such, for example, as paint on the wheels or grease or other drippings which fall from the journal boxes. In other words, the apparatus when functioning as a retarder operates independently of variations in the coefficient of friction between the wheels and the rails.

A most important advantage of the apparatus embodying my invention when Retard operation is desired, is that a retarder approximately 27 feet 8 inches long is capable of exerting a braking concentration per unit length of track which is substantially equal to the braking force of a conventional brake-bar type retarder whose length is approximately 84 feet 5 inches. In one preferred arrangement which has been under consideration, such a retarder would consist of five units of the type described hereinabove and illustrated in FIG. 4, each unit having a length of approximately five feet, as previously mentioned, and being spaced from each other so that adjacent units are separated by approximately six inches. The use of my present invention as a retarder thus promises a material reduction in the amount of apparatus necessary for satisfactory braking service and also suggests an attendant reduction in cost in yards known to me where the volume of operations is vast.

*Accelerator*

Let us assume now that a car is sluggish in moving when cut loose from the hump train so that its chances of coupling with the car having preceded it clearly are low. To thus increase the speed of the car, circuit controller 135 is set to the Accelerate position whereupon winding 132a of solenoid valve 132 becomes energized, the other solenoid valves 130 and 134 being deenergized. Poppet valve 58 at this time is closed; also, low pressure fluid from accumulator 90 is admitted to conduit 28 through conduits 91 and 92 and check valve 89. The poppet valves 60a–60f are all open so that chambers 46 in all of the cylinders associated with the treadles are charged with high pressure fluid from accumulator 66 through conduit 64 and the conduits 48. With winding 132a energized, a fluid circuit is established between manifold line 50 and chamber 128 in cylinder 118 of pressure control valve 84 through ports 132d and 132e in solenoid valve 132. Line 52 which leads into port 36 in cylinder 32a is exposed to the fluid in low pressure accumulator 90 through ports 130d and 130f in solenoid valve 130, conduit 138, ports 134d and 134f in solenoid valve 134, and conduit 91. The fluid in all of the cylinders 32a–32g now has a pressure greater at the lower than the upper side of pistons 44 whereupon valves 39 and 40 therein are actuated to the positions shown in FIG. 4a. Port 34 in cylinder 32a is now covered. Port 36 in the same cylinder is exposed to the fluid in low pressure accumulator 90 over the previously-traced path including line 52 whereby the cylinder is filled with low pressure fluid. The ports 36 in the cylinders associated with treadles 18b–18g are exposed to the fluid in line 50 whereby these cylinders become filled. The other ports 34, now covered, in cylinders 32b–32g are similarly exposed to the fluid in low pressure accumulator 90.

When the first wheel of the vehicle contacts treadle 16, fluid in line 28 is displaced by the movement of piston 24 and causes check valve 78 and the respective pistons 75b and 76b of spool valves 75 and 76 to operate sequentially as described hereinabove, so that fluid entering conduits 79 and 80 following the opening of valve 78 is at a pressure proportional to the weight sustained by the wheel. The pressure in conduit 80 acts against piston 122 in cylinder 116 of pressure control valve 84 and increases the compression of spring 121 which, in turn, biases valve 120 closed with a greater force. Although piston 102 in cylinder 95 of the other pressure control valve 82 is simultaneously subjected to the increased pressure in conduit 79, pressure control valve 82 is in effect disconnected from the system and rendered inoperative since port 130e of solenoid valve 130 is covered during Accelerator operation. It will be plain that the force now holding valve 120 in pressure control valve 84 closed is proportional to the load on the wheel and that the pressure in accumulator 66 tending to move piston 125 to the left is opposed by the pressure of the fluid trapped in chamber 126. Therefore, for the fluid in chamber 126 to escape into line 124 through the port controlled by valve 120 the force biasing valve 120 closed must be overcome. Since the position of piston 125 controls the position of valve 125a relative to its seat, it will be clear that the pressure charging chamber 128, the chamber in solenoid valve 132 between ports 132d and 132e manifold line 50, and the cylinders associated with the treadles 18b–18g is set according to the weight proportional force acting on piston 122.

When the first truck wheel leaves treadle 16, the pressure developed in line 28 is relieved, whereupon treadle 16 is promptly returned to its standby position as hereinabove described.

As soon as the wheel engages treadle 18a, the treadle begins to shift positions which cause poppet valve 60a to close. As the wheel continues to act on treadle 18a, fluid in cylinder 32a is displaced into accumulator 90 through port 36 of cylinder 32a, line 52, and the remaining portion of the hydraulic circuit previously traced. The displaced fluid encounters very little resistance during its passage to accumulator 90 and, therefore, treadle 18 moves downwardly under the wheel with little or practically no retarding effect on the wheel.

The continued depression of treadle 18a causes the opening of poppet valve 58 at a time when the wheel has not yet reached treadle 18b so that poppet valve 60b is still open. The opening of valve 58 relieves the pressure in line 48 and in the chambers 46 in all of the cylinders to that pressure in sump 69. The pressure on the opposite sides of each piston 44 is now such that valves 39 and 40 in all of the cylinders are shifted downward by their respective biasing springs. At this time, caused by this shifting of the valves, the cylinders associated with treadles 18b–18g are now filled with fluid from low pressure accumulator 90 which enters the cylinders through ports 34 thereof. At the same time, the underside of piston 31 in cylinder 32a is exposed to the fluid in high pressure accumulator 66 over the previously described fluid circuit including port 34 of this cylinder and manifold line 50.

I will now assume that the wheel is engaging treadle 18b, is about to engage treadle 18c, and is about to leave treadle 18a so that the trailing edge or apex of treadle 18a is substantially coplanar with the running surface of the rail. Under the assumption, due to the particular construction of the wheel and the shape and dimension of the speed control treadles as described hereinabove, the trailing edge of treadle 18a is located just to the rear of the center of the wheel. The pressure in accumulator 66 now rapidly forces the piston connected with treadle 18a upwardly against the wheel. The effect of this motion is a thrust developed between the treadle and the wheel in its original direction of rotation which tends to increase the energy of the car. As yet, poppet valve 60a has not yet reopened. When, however, this poppet valve does reopen, which will occur when treadle 18a has completed its up-stroke, high pressure fluid in line 64 from accumulator 66 is admitted to the chambers 46 in the cylinders associated with treadles 18a and 18b. This fluid is prevented from entering the chamber 46 in the cylinder associated with treadle 18c because the poppet valve 69b is still closed. Valves 39 and 40 in cylinders 32a and 32b are now shifted upwardly to cover the respective ports 34 therein and to uncover their respective ports 36. Through port 36 in the cylinder 32a, the cylinder is filled with fluid from low pressure accumulator 90. At the same time, port 36 in cylinder 32b is now connected to chamber 128 in pressure control valve 84 through manifold line 50 and ports 132d and 132e in solenoid valve 132. When the wheel ceases to depress treadle 18b, the fluid in accumulator 66 forcibly urges the piston connected to treadle 18b upwardly, the treadle thereby being returned to its standby position and exerting a thrust against the after part of the wheel to impart energy to the car.

At substantially the time the wheel moves completely out of contact with treadle 18b, the wheel is acting against treadles 18c and 18d and is about to engage treadle 18e. When treadle 18b reaches its standby condition, it causes the opening of valve 60b so that valves 39 and 40 in cylinder 32c are shifted upwardly to cause, in the manner set forth above, still further energy to be added to the car. The remaining treadles in the accelerator will act in a correspondingly similar sequential fashion to still further increase the speed of the car.

After the wheel has left treadle 18g and the treadle has been returned to its standby position, the following hydraulic conditions in the system prevail; the pressure in line 28 is that in low pressure accumulator 90; likewise, the pressure of the fluid in cylinder 32a is that in accumulator 90; the pressure in the cylinders associated with all of the other treadles is that in high pressure accumulator 66; the chambers 46 in all of the cylinders are likewise filled with fluid from accumulator 66; and pistons 75b and 76b respectively of valves 75 and 76 have returned to their standby positions.

In further considering the action of the apparatus in the Accelerator condition, when the second wheel of the truck engages treadle 16, the fluid pressure in conduits 79 and 80 is dumped into low pressure accumulator 90, in the manner described above, due to the coaction of valve 78 with the respective pistons 75b and 76b of spool valves 75 and 76. As similarly hereinabove described, a new pressure is developed in conduits 79 and 80 and the registered weight of the second wheel is thus held until the arrival of the next wheel of the car. Obviously, for acceleration, the manner of operation of my system in response to the second truck wheel is the same as that described hereinabove in connection with the first wheel.

Thus, by the use of the apparatus of my invention as an accelerator, a more-or-less continuous and weight proportional force, which overcomes the speed deficiency of the car, is applied behind the car wheels in their original direction of rotation. On all cars for which the unit is designed, it will be understood that the maximum pressure available in the system for raising respective ones of the treadles to their standby positions will be less than that which would raise a wheel from the rail.

*Off*

When the operator determines that a car being humped is moving at a satisfactory speed, or when for any other special reason it is desired to take the speed control treadles out of the system, circuit controller 135 is set to the Off position. This energizes winding 134a of solenoid valve 134, the other solenoid valves 130 and 132 being deenergized. Spool valves 130c and 132c respectively in solenoid valves 130 and 132 are then biased by their respective springs to positions in which port 130e in solenoid valve 130 and port 132e in solenoid valve 132 are covered. As will be appreciated, the concurrent deenergization of solenoid valves 130 and 132 renders the pressure control valves 82 and 84 ineffective. With spool valve 130c in solenoid valve 130 moved to the right, line 52 communicates directly with sump 69 over a relatively low fluid resistance path through ports 130d and 130f in solenoid valve 130, conduit 138, and ports 134d and 134e in solenoid valve 134. Line 50 likewise communicates with the sump over a similar low resistance path through ports 132d and 132f in solenoid valve 132, conduit 138, and ports 134d and 134e in solenoid valve 134. Through conduit 64, poppet valves 60a–60f and the conduits 48, the chambers 46 in the cylinders 32a–32g are filled with fluid from accumulator 66 so that valves 39 and 40 in all of the cylinders are actuated to the positions shown in FIG. 4a.

When the first truck wheel of the car it is decided to let pass unimpeded engages treadle 16, a fluid pressure force proportional to the load supported by the wheel is developed in conduits 79 and 80, as hereinabove described. Due, however, to the deenergized conditions of solenoid valves 130 and 132 at this time, the proportionate response of the control valves to the hydraulically registered weight is of no effect. When the wheel engages treadle 18a, the fluid displaced in cylinder 32a meets little resistance and is expelled through port 36 into line 52 and then flows into the sump over the previously-traced fluid path including solenoid valve 130. Prior to the time the wheel engages treadle 18b, valve 58 opens causing the pressure in chambers 46 of all of the cylinders to fall to the pressure in the sump, whereupon valves 39 and 40 in these cylinders shift to their lower positions. Fluid in the cylinders associated with the other treadles 18b–18g, when these treadles are engaged by the wheels, is now expelled through ports 34 thereof into line 52 allowing the fluid to drain into the sump. As the respective treadles are depressed, their movement is resisted only by the relatively low pressure in sump 69 so that their retarding effect on the first wheel may be considered negligible. The treadles will now remain depressed out of operation and successive wheels traveling over the retarder will engage only the weigh treadle but to no effect.

means disposed adjacent a track rail of a railway track for developing a fluid pressure control force proportional to the weight of each wheel passing over said rail, storage means including fluid connections with said first means and being responsive to said pressure control force for storing it for an interval determined by the distance between adjacent wheels, and means hydraulically connected with said storage means and subsequently rolled over by the wheels for applying against each wheel a speed regulating force proportional to the control force developed by that wheel.

4. Vehicle speed controlling apparatus comprising means disposed alongside a track rail of a railway track for carrying a wheel running on said rail, translation means actuated by said wheel-carrying means for translating the load sustained by each wheel into energy indicating the magnitude of such load, storage means having connections with and controlled by said translation means for storing the energy developed by each wheel until the actuation of said wheel-carrying means by the next wheel, and means having connections with and controlled by said storage means and positioned adjacent said rail for exerting on the wheels after their departure from said wheel-carrying means a speed control effort substantially proportional to the value of said energy.

5. Vehicle speed controlling apparatus comprising means disposed alongside a track rail of a railway track for carrying a wheel running on said rail, a hydraulic system connected with said wheel-carrying means for developing a hydraulic pressure approximately indicating the load sustained by each wheel, fluid pressure storage apparatus fluidly connected to said hydraulic system and responsive to said developed pressure for producing a fluid pressure force substantially proportional to the pressure developed by each wheel, said apparatus maintaining said fluid pressure force substantially constant until the next wheel acts on said wheel-carrying means, and energy transferring means connected to and controlled by said storage apparatus and positioned adjacent the rail for exerting on the wheels after their departure from said wheel-carrying means a speed controlling effort approximately proportional to the fluid pressure force stored in said storage apparatus.

6. Vehicle speed controlling apparatus comprising a vertically movable treadle so disposed alongside a rail of a railway track as to be engaged and depressed by wheels running along said rail, a cylinder, a piston in said cylinder movable in response to movement of said treadle, a hydraulic system including fluid connections with said cylinder for developing a hydraulic pressure approximately indicating the load imposed on each wheel, fluid pressure storage means fluidly connected to said hydraulic system and responsive to said developed pressure for producing a fluid pressure control force substantially proportional to said hydraulic pressure, and energy transfer means connected to and controlled by said storage means and positioned adjacent said rail for exerting on each wheel after it leaves said treadle a speed control effort approximately proportional to the control force stored for that wheel.

7. Vehicle speed controlling apparatus comprising, in combination, plural vehicle speed controller units movable vertically independently of each other and so disposed alongside a track rail of a railway track as to be engaged one after the other by a wheel moving over said rail, a vertically movable treadle so positioned adjacent said rail as to carry the car wheels before they engage the first of said units, means hydraulically connected with said treadle for developing a fluid pressure proportional to the weight sustained by each of the wheels, storage means fluidly communicating with said hydraulically-connected means for developing a fluid pressure control force substantially proportional to said developed fluid pressure, said storage means maintaining said control force substantially constant until the following wheel engages said treadle, and fluid control means having pressure connections between said storage means and each of said speed controller units whereby each wheel moving over said units is subjected to successive speed controlling efforts each approximately proportional to the fluid pressure control force stored for that wheel.

8. Vehicle speed controlling apparatus comprising a treadle arranged alongside one of the rails of a trackway in a position to be run over by wheels running on said rail, a piston connected with said treadle, a cylinder receiving said piston, a vertically movable second treadle disposed alongside said rail in advance of said first treadle and depressed by the wheels, a second piston connected to said second treadle, a second cylinder receiving said second piston, hydraulic equipment communicating with said second cylinder whereby a pressure is developed in said equipment each time said second treadle is depressed, storage means fluidly connected to said hydraulic equipment and responsive to said developed pressure for producing and storing a fluid pressure control force approximately proportional to said developed pressure, said storage means maintaining said control force substantially constant until the next wheel engages said second treadle, and fluid control means having connections extending between said storage means and said first cylinder such that the reaction of said first treadle to the passage of a wheel varies directly in proportion to the value of the control force stored in response to that wheel.

9. Vehicle speed controlling apparatus comprising two vertically movable speed controlling treadles one located alongside each rail of a trackway in a manner to be engaged by opposite axle wheels running on the rails, first pistons each movable with one of said treadles, first cylinders each receiving one of said first pistons, two other vertically movable treadles disposed in advance of said speed controlling treadles in a manner to carry opposite axle wheels passing on the rails, second pistons each connected with one of said advance-located treadles, second cylinders each receiving one of said second pistons, hydraulic fluid in said second cylinders whereby a pressure is developed in each of said second cylinders in an amount proportional to the weight sustained by wheels actuating said advance-located treadles, first and second fluid pressure storage means fluidly connected respectively with one and the other of said second cylinders for developing and storing a fluid pressure control force approximately proportional to said developed pressures, and fluid control means having connections respectively extending between said first and second storage means and one and the other of said first cylinders whereby said speed controlling treadles exert a speed controlling effort against the wheels which varies directly in proportion to the respective control forces stored in said first and second storage means.

10. Vehicle speed controlling apparatus including a treadle disposed alongside a track rail of trackway and having a normal position to carry a wheel running on said rail, a second treadle positioned adjacent said track rail and controllable to a speed controlling relation with wheels subsequent to when they leave said first treadle, a piston connected to said first treadle, a cylinder receiving said piston, a hydraulic system in fluid communication with said cylinder whereby when said first treadle is carrying a wheel a pressure is developed in said system roughly proportional to the weight load sustained by the wheel, fluid pressure storage means in fluid connection with said hydraulic system and responsive to said developed pressure for producing a fluid pressure control force substantially proportional to said developed pressure, control means for hydraulically exposing said second treadle to the control force currently stored in said storage means whereby the extent of speed control effort expended by said second treadle against each wheel varies directly in proportion to the control force developed for that wheel, and fluid pressure source means connected to said first treadle for returning said first treadle to its normal position when it no longer carries a wheel.

11. A car retarder comprising a vertically movable brake member disposed alongside a track rail of a trackway and normally projecting above said rail in a first position and depressed by wheels passing on said rail to a second position, and hydraulic means actuated by the wheels before they reach said brake member and operatively connected with said brake member for resisting its depression under the wheels with a force substantially proportional to the weight sustained by that wheel.

12. In combination with at least one vertically movable brake member disposed alongside and projecting above the track rail of a railway track in a manner to be engaged and depressed by wheels running along said rail, fluid pressure means hydraulically connected with said brake member for dissipating the energy of wheels engaging said brake member in accordance with the pressure in said fluid pressure means, and means fluidly connected to said fluid pressure means and actuated by a wheel before it reaches said brake member for establishing the pressure in said fluid pressure means to a value approximately proportional to the load imposed on that wheel.

13. A car retarder comprising a treadle disposed alongside the track rail of a railway track in a position to be actuated from a first to a second position by passing wheels, a cylinder containing fluid, piston means in said cylinder movable with said treadle for displacing said fluid from said cylinder when said treadle is moved from its first to its second position, a valve member including a restricted orifice, means for fluidly connecting said cylinder and said valve member to direct the fluid displaced from said cylinder through said orifice whereby said fluid is heated, means fluidly connected with said valve member and actuated by the wheels prior to when they reach said treadle for setting the opening of said orifice in accordance with the load on each wheel, and fluid means for returning said treadle from its second to its first position upon the departure of each wheel from said treadle to recharge said cylinder with fluid during said return movement.

14. A car retarder comprising a treadle disposed alongside the track rail of a railway track and so projecting above said rail as to be engaged and moved by passing wheels from a first to a second position, a cylinder containing fluid, piston means in said cylinder movable with said treadle for displacing said fluid from said cylinder upon movement of said treadle from its first to its second position, a valve member including a restricted orifice and a port at one side of said orifice exposed to the fluid in said cylinder, said fluid displaced from said cylinder entering said valve member and being heated at said orifice to dissipate a portion of the energy of the wheel currently engaging said treadle, means fluidly connected with said valve member and actuated by the wheels prior to when they reach said treadle for setting the opening of said orifice in accordance with the load on each wheel, and fluid means for returning said treadle from its second to its first position upon the departure of each wheel from said treadle to refill said cylinder with fluid during said return movement.

15. Car retarding apparatus comprising a treadle disposed adjacent at least one track rail of a railway track in a position to be actuated by passing wheels from a first position to a second position, a cylinder containing fluid, a piston in said cylinder movable with said treadle and displacing said fluid from said cylinder when said treadle is moved from its first to its second position, a valve member including a restricted orifice and a port at one end of said orifice connected to the fluid in said cylinder, said fluid displaced from said cylinder entering said valve member and being heated at said orifice to dissipate a portion of the energy of the wheel engaging said treadle, means fluidly connected with said valve member and actuated by the wheels prior to when they reach said treadle for setting the opening of said orifice in accordance with the load on each wheel, and means in fluid connection with said cylinder for actuating said piston to return said treadle from its second to its first position upon the departure of each wheel from said treadle.

16. In a car retarder, a plurality of vertically movable brake members disposed alongside a track rail of a railway track and projecting above the rail to be engaged and moved downwardly one after another by wheels running along said rail, a plurality of pistons each responsive to movement of one of said brake members, a plurality of cylinders each receiving one of said pistons and containing fluid at the underside of said pistons, whereby a pressure is developed in each of said cylinders upon downward movement of its associated piston, weight-responsive means actuated by said wheels prior to when the travel over said brake members for translating the loads on the wheels into fluid energy substantially proportional to said loads, fluid pressure storage means fluidly connected to and controlled by said weight-responsive means for developing a fluid pressure control force substantially proportional to said fluid energy, said storage means maintaining such control force substantially unchanged until the next wheel registers its load, and fluid pressure conducting means connected between said storage means and each of said cylinders for consecutively exposing the undersides of said pistons to the fluid pressure force in said storage means, whereby energy from the wheels is absorbed by said brake members when run over in an amount dependent on the intensity of the control force in said storage means.

17. A car retarder comprising a plurality of depressible brake members disposed alongside a track rail of a trackway such to be engaged one after the other by wheels running on the rail, a treadle positioned adjacent said rail in advance of said brake members, means connected to and responsive to movement of said treadle for developing a pressure approximately proportional to the weight carried by each of said wheels, a pressure control valve fluidly connected to said means and responsive to said developed pressure for producing a fluid pressure control force substantially proportional to the developed pressure, a throttling valve in said pressure control valve controlled relatively to its seat in accordance with said fluid pressure control force, a plurality of pistons each movable with one of said brake members, a plurality of fluid-filled cylinders each receiving one of said pistons, and each of said cylinders including a port communicating with said pressure control valve at the throttling side of said throttling valve, whereby upon depression of said brake members by said wheels fluid is displaced from said cylinders and is heated at said throttling valve to reduce the kinetic energy of said wheels.

18. A car retarder comprising vertically movable first and second treadles disposed alongside a track rail of a trackway and arranged to be engaged and depressed one after the other respectively by wheels running along said rail, means fluidly connected to said first treadle and responsive to movement of said first treadle for developing and storing a fluid pressure control force substantially proportional to the weight sustained by each wheel, other means connected to and controlling said first-named means for maintaining the fluid pressure control force substantially constant during the interval said first treadle is between consecutive wheels of a car, said other means releasing said fluid pressure control force from said first-named means each time a wheel engages said first treadle, means connected to and responsive to depression of said second treadle for producing a second pressure, and throttle valve means exposed to said second pressure and controlled by said first-named means to an opening determined by said control force for dissipating a portion of the kinetic energy of wheels engaging said second treadle.

19. Car accelerator apparatus comprising a treadle disposed alongside a track rail of a trackway such to be moved by passing wheels from a first to a second position, means hydraulically connected with said treadle and responsive to movement of said treadle for developing a pressure substantially proportional to the weight sustained by the car wheels, and vertically movable wheel-engaging means hydraulically connected with said first means for imparting to said wheels subsequent to their passage over said treadle an accelerating force substantially proportional to the pressure developed by each wheel.

20. Car accelerator apparatus comprising a treadle disposed adjacent a track rail of a trackway in a position to be actuated from a first position to a second position by wheels passing on said rail, a cylinder including inlet and outlet ports, a piston reciprocable in said cylinder above said ports and attached to said treadle, a valve in said cylinder controlling said ports and covering said inlet port and uncovering said outlet port prior to when said treadle is actuated and during movement of said treadle from its first to its second position, means actuated by said treadle in its second position for shifting said valve to cover said outlet port and uncover said inlet port, a first source of fluid pressure having a predetermined pressure and including a port fluidly connected to the outlet port of said cylinder, the fluid in said cylinder displaced during movement of said treadle from its first to its second position entering said first source, a valve member including a restricted orifice and ports on opposite sides of said orifice, a fluid conduit connecting one of the ports of said valve member and the inlet port of said cylinder, and a second source of fluid pressure having a pressure greater than that of said first source and including an outlet port fluidly connected with the other port of said valve member, the fluid from said second source entering said cylinder through said orifice when said treadle occupies its second position to actuate said treadle from its second to its first position and thereby impart an accelerating force to the wheels.

21. Car accelerator apparatus comprising a treadle disposed adjacent a track rail of a trackway in a position to be actuated from a first position to a second position by passing wheels, a cylinder including inlet and outlet ports, a piston reciprocable in said cylinder above said ports and attached to said treadle, a valve in said cylinder controlling said ports and covering the inlet port and uncovering the outlet port prior to when said treadle is actuated and during movement of said treadle from its first to its second position, means actuated by said treadle in its second position for shifting said valve to cover said outlet port and uncover said inlet port, a first source of fluid pressure having a predetermined pressure and including a port fluidly connected to the outlet port of said cylinder, the fluid in said cylinder displaced during movement of said treadle from its first to its second position entering said first source, a valve member including a restricted orifice and ports on opposite sides of said orifice, adjustable valve means movable in said valve member relative to said orifice for adjusting the restriction of said orifice, a fluid conduit connecting one of the ports of said valve member and the inlet port of said cylinder, a second source of fluid pressure having a pressure greater than that of said first source, said second source including an outlet port fluidly connected with the other port of said valve member, the fluid from said second source entering said cylinder through said orifice when said treadle occupies its second position to actuate said piston to move said treadle from its second to its first position whereby an accelerating force is imparted to said wheels, and means connected to said valve means and actuated by said wheels prior to when they reach said treadle for controlling said valve means to adjust the restriction of said orifice in accordance with the load on each wheel.

22. A car accelerator comprising, weight-responsive means disposed alongside a rail of a trackway for weighing the wheels of a railway car running on said rail, storage means connected to and controlled by said weight-responsive means for developing a fluid pressure control force substantially proportional to the load on each of said wheels, a vertically movable treadle disposed adjacent said rail and normally occupying a first position and being depressed to a second position by wheels subsequent to their weighing, said treadle having adjacent its trailing edge a point of application of force disposed to thrust upwardly against each wheel to accelerate it during movement of said treadle from its second position to its standby position, and fluid pressure source means connected to and controlled by said storage means for moving said treadle from its depressed position to its standby position with a force proportional to the fluid pressure control force stored in said storage means for respective ones of said wheels.

23. A car accelerator system comprising a treadle disposed alongside a rail of a railway track and engaged by successive car wheels passing along said rail, a second vertically movable treadle disposed adjacent said rail and being actuated by said wheels following their departure from said first treadle from a first position to a second position, weight-responsive means associated with said first treadle for weighing each wheel acting on it, a pressure control valve member connected to and controlled by said weight-responsive means and developing a fluid pressure control force substantially proportional to the weight of each of said wheels, a valve member disposed in said pressure control valve member in such manner that said developed control force tends to bias said valve member open, a source of fluid pressure connected with said pressure control valve member such to tend to bias said valve closed, and means effective each time said second treadle occupies its second position for hydraulically connecting said second treadle with said source through said valve member whereby said second treadle is urged toward its first position to impart a force against each wheel in the original direction of its rotation.

24. In a car accelerator, a first treadle disposed alongside a track rail of a trackway such to be engaged by wheels passing on said rail, a second treadle disposed adjacent said rail to be engaged by said wheels following their passage over said first treadle, said first treadle being moved by said wheels from a first position to a second variable position determined by the weights on said wheels, said second treadle sloping upwardly in the direction of traffic and ending substantially in an apex, a piston connected to said second treadle, a cylinder receiving said piston and containing hydraulic fluid offering substantially no resistance to displacement of said piston when said second treadle is depressed to allow rapid depression of said second treadle under the wheels, hydraulic means fluidly connected to and responsive to movement of said first treadle for translating the degree of its movement into a fluid pressure control force substantially proportional to the weight on each of said wheels, high fluid pressure source means connected to and controlled by said hydraulic means for supplying a pressure force substantially proportional to said control force at any given time, a valve member actuated by said second treadle from a first to a second position when said second treadle occupies its second position, and valve means effective when said valve member is in its second position for exposing the underside of said piston to said high pressure force supplied by said fluid pressure source means, whereby after the center of a car wheel passes over said apex said second treadle is thrust rapidly upwardly against the wheel to impart energy to the car.

25. A car accelerator comprising vertically movable first and second treadles disposed alongside a rail of a trackway to be engaged and actuated respectively one after another from a standby position to a depressed position by car wheels running on said rail, a piston connected with said second treadle, a cylinder receiving said second piston and including a port exposed at times to the underside of said piston, valve means reciprocable in said cylinder below said piston for covering and uncovering said port when said second treadle occupies its standby and depressed positions respectively, hydraulic pressure equipment fluidly connected to and responsive to depression of said first treadle for developing a pressure substantially proportional to the weight sustained by each of said wheels, and fluid pressure source means connected to and controlled by said hydraulic pressure equipment for transmitting to said port when further depression of said second treadle by a wheel is discontinued, a pressure fluid force substantially proportional to said developed pressure for that wheel, said pressure fluid force appearing at the underside of said piston to thrust said second treadle upwardly against the wheel in the original direction of its rotation to impart energy to the car.

26. A car accelerator comprising two vertically movable treadles one located alongside each rail of a trackway and in a manner to be moved from a standby position to a depressed position by opposite axle wheels running on the rails, respective pistons movable with each of said treadles, respective cylinders receiving each of said pistons and including a port exposed at times to the underside of said respective pistons, valve means reciprocable in said cylinders below the associated pistons for covering and uncovering said ports when said treadles occupy their standby and depressed positions respectively, wheel-actuable fluid means disposed alongside each of said rails in advance of said treadles for developing a pressure substantially proportional to the weight sustained by each of said opposite wheels, and first and second fluid pressure source means including fluid connections and responsive respectively to said developed pressure in one and the other of said fluid means for transmitting to each of said ports a pressure fluid force substantially proportional to said developed pressures, said fluid pressure force at each of said pistons thrusting said treadles from their depressed to their standby positions whereby the wheels are propelled by said treadles and their rotational speeds are increased.

27. Combination car retarder-accelerator apparatus comprising a vertically movable member disposed alongside a track rail of a trackway and normally projecting above the rail in a standby position to be moved to a depressed position by passing wheels, fluid pressure retarding means including fluid connections with said member whereby said retarding means is selectively hydraulically connected at times with said member for resisting its depression under the wheels to retard their speeds, and fluid pressure accelerating means including fluid connections with said member whereby said accelerating means is selectively hydraulically connected at other times with said member for thrusting said member upwardly against the wheels behind their centers so as to increase their speeds.

28. Combination car retarder-accelerator apparatus comprising a vertically movable member disposed alongside a track rail of a trackway normally in a standby position to be actuated by passing wheels to a depressed position, a cylinder having first and second ports and containing fluid, a piston reciprocable in said cylinder above said ports and attached to said member, said piston displacing the fluid from said cylinder each time said member is depressed under a wheel; a valve member reciprocable in said cylinder and covering said first port and uncovering said second port when said member occupies its standby position, and uncovering said first port and covering said second port when said member occupies its depressed position, whereby only one of said ports is exposed to the underside of said piston at any given time; a wheel-actuable treadle positioned adjacent said rail in advance of said member, a first and second fluid means concurrently responsive to actuation of said treadle for developing a pressure proportional to the weight sustained by each of said wheels, hydraulic pressure equipment including fluid connections with said treadle also being responsive to actuation of said treadle for releasing the pressure developed in said first and second fluid means at the time a pressure is to be developed by a succeeding wheel, a throttle valve including a valve seat associated with said first fluid means and so exposed to said developed pressure in said first fluid means as to be positioned relatively to its valve seat in accordance with the magnitude of said developed pressure, fluid connections completed at preselected times between the throttling portion of said throttle valve and the second port in said cylinder, a first operator-controlled valve means for completing said fluid connections when and only when retardation is desired whereby during depression of said member by wheels the fluid displaced from said cylinder is throttled to thus reduce the kinetic energy of the wheels, fluid pressure source means controlled by said second fluid means for supplying an exit pressure substantially proportional to said pressure developed in said second fluid means, other fluid connections completed at preselected times between the exit pressure port of said source means and the first port in said cylinder whereby when said member is depressed fluid pressure from said source means is supplied to the first port in said cylinder and said member is thrust upwardly against the wheels in the original direction of rotation to increase their speeds, and a second operator-controlled valve means for completing said other fluid connections when and only when acceleration is desired.

29. Combination car retarder-accelerator apparatus comprising a first treadle disposed alongside a track rail of a trackway in a standby position and projecting above said rail for being actuated by passing wheels to a depressed position, said first treadle having a running surface inclined upwardly in the direction of traffic and terminating at the trailing end thereof substantially in an apex, a piston connected with said first treadle, a cylinder filled with hydraulic fluid receiving said piston and having first and second ports disposed below and in non-interfering relation with said piston; a valve for controlling said ports reciprocable in said cylinder and having a first position when said first treadle occupies its standby condition for covering said first port and uncovering said second port, and having a second position when said first treadle is depressed for uncovering said first port and covering said second port; a wheel-actuable second treadle positioned adjacent said rail in advance of said first treadle, first and second fluid pressure control valve members including fluid connections with said second treadle being simultaneously responsive to actuation of said second treadle for developing respectively a fluid pressure control force substantially proportional to the load on each wheel, hydraulic pressure equipment including fluid connections with said second treadle being simultaneously responsive also to actuation of said second treadle and being so connected with said control valve members as to relieve said developed pressures upon actuation of said second treadle by each successive wheel, a first fluid conducting path including a first solenoid valve means effective only in one position for establishing communication between the second port in said cylinder and said first fluid pressure control valve member, whereby upon depression of said first treadle by the wheels movement of said piston is resisted by said control force in said first fluid pressure control valve to effectively retard the car wheels, high pressure fluid source means including fluid connections for supplying to an exit port of said second fluid pressure control valve member an exit pressure substantially proportional to the fluid pressure force currently stored in said second fluid pressure control valve member, a second fluid conducting path including a second solenoid valve means effective only in one position for establishing communication between the first port in said cylinder and said exit port, whereby following depression of said member under the wheels the underside of said piston is exposed to the high pressure at said exit port causing rapid upward movement of said piston and propulsion of the wheels in the original direction of motion by the apex of said first treadle to accelerate the wheels, and a circuit controller selectively movable between first and second positions for respectively actuating said first and second solenoid valve means to their said one position to achieve either retardation or acceleration of a car in accordance with the speed control effort desired.

30. In combination with a railway track, a car retarder comprising a reciprocable member positioned alongside at least one of the rails of said track in a first position and projecting above said rail for being actuated by passing wheels from said first to a second position, fluid pressure equipment hydraulically connected with said member to resist its depression with a force proportional to the pressure in said fluid pressure equipment, fluid pressure means including fluid connections cooperating with said wheels before they reach said member for establishing in said fluid pressure equipment a pressure proportional to the weight sustained by each of the wheels, a by-pass fluid circuit arrangement hydraulically connected with said member when and only when continuous removal of said member from its standby position to a position out of contact with all wheels other than the first wheel is desired, said by-pass fluid circuit containing a pressure much less than that at any given time in said fluid pressure equipment whereby said member is depressed by the first wheel to a position in which engagement with subsequent wheels is discontinued, and a restoring fluid circuit arrangement containing a pressure for selectively actuating said member upwardly to its standby position to again be engaged by the wheels.

31. In combination with a railway track, a car retarder comprising a reciprocable member projecting above at least one of the rails of the track normally in a standby position and being engaged by passing wheels and depressed, a piston movable with said member, a cylinder receiving said piston and having first and second ports covered and uncovered respectively when said member occupies its standby position and uncovered and covered respectively when said member is under a wheel, fluid pressure equipment communicating with said second port, weight-responsive means including fluid connections engaged by the wheels before they reach said member for establishing in said fluid pressure equipment a pressure proportional to the weight sustained by each of the wheels, whereby said member presses against the wheels of the car to retard it, a fluid release circuit arrangement connected with said second port through said fluid pressure equipment when and only when removal of said member to a depressed position out of contact with all wheels other than the first wheel is desired, said fluid release circuit containing a pressure much less than that at any given time in said fluid pressure equipment enabling rapid depression of said member by the first wheel to a position out of engagement with subsequent wheels, and a fluid restoring circuit arrangement connectable with said first port and effective when connected thereto to actuate said member upwardly to its standby position whereby said member may again be engaged by the wheels.

References Cited in the file of this patent

UNITED STATES PATENTS

| | | |
|---|---|---|
| 1,349,387 | Simpson | Aug. 10, 1920 |
| 1,626,920 | Coleman | May 3, 1927 |
| 3,040,676 | Checkley et al. | June 26, 1962 |

FOREIGN PATENTS

| | | |
|---|---|---|
| 547,671 | Canada | Oct. 15, 1957 |